United States Patent
Yuan

(10) Patent No.: US 11,122,489 B2
(45) Date of Patent: Sep. 14, 2021

(54) ON-BOARD VEHICULAR COMMUNICATION SYSTEM

(71) Applicant: HONDA MOTOR CO., LTD., Tokyo (JP)

(72) Inventor: Alvin Teh Yuan, Carson, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 16/782,783

(22) Filed: Feb. 5, 2020

(65) Prior Publication Data

US 2020/0178150 A1 Jun. 4, 2020

Related U.S. Application Data

(63) Continuation of application No. 15/684,664, filed on Aug. 23, 2017, now Pat. No. 10,602,421.

(51) Int. Cl.

| | |
|---|---|
| *H04W 36/00* | (2009.01) |
| *H04W 40/02* | (2009.01) |
| *H04W 4/20* | (2018.01) |
| *H04W 4/24* | (2018.01) |
| *H04L 12/26* | (2006.01) |
| *H04L 12/24* | (2006.01) |
| *H04L 12/725* | (2013.01) |
| *H04L 29/08* | (2006.01) |
| *H04L 12/707* | (2013.01) |
| *H04L 12/841* | (2013.01) |
| *H04M 15/00* | (2006.01) |

(Continued)

(52) U.S. Cl.
CPC .......... *H04W 40/02* (2013.01); *H04L 41/082* (2013.01); *H04L 43/106* (2013.01); *H04L 45/22* (2013.01); *H04L 45/302* (2013.01); *H04L 47/28* (2013.01); *H04L 67/327* (2013.01); *H04M 15/8038* (2013.01); *H04M 15/8044* (2013.01); *H04M 15/8055* (2013.01); *H04W 4/20* (2013.01); *H04W 4/24* (2013.01); *H04W 4/48* (2018.02); *H04W 4/50* (2018.02); *G07C 5/008* (2013.01); *H04Q 9/02* (2013.01); *H04Q 2209/40* (2013.01)

(58) Field of Classification Search
CPC ............ H04W 36/0077; H04W 56/00; H04W 74/0891; H04L 7/00; H04M 2203/554
See application file for complete search history.

(56) References Cited

U.S. PATENT DOCUMENTS

| | | |
|---|---|---|
| 6,151,497 A | 11/2000 | Yee et al. |
| 6,615,186 B1 | 9/2003 | Kolls |

(Continued)

*Primary Examiner* — Rafael Pérez-Gutiérrez
*Assistant Examiner* — Xiang Zhang
(74) *Attorney, Agent, or Firm* — Arent Fox LLP

(57) ABSTRACT

A system and method of obtaining update information include receiving a request for an update from a mobile device, determining whether the request for update is for a scheduled update or an unscheduled update, in response to determining that the request for update is for an unscheduled update: requesting a first update information from a high-speed provider, receiving the first update information from the high-speed provider, and sending the first update information to the mobile device, and in response to determining the update is for a scheduled update: requesting a second update information from the telematics system, receiving the second update information from the telematics system, and sending the second update information to the mobile device.

20 Claims, 8 Drawing Sheets

(51) Int. Cl.
*H04W 4/50* (2018.01)
*H04W 4/48* (2018.01)
*G07C 5/00* (2006.01)
*H04Q 9/02* (2006.01)

(56) References Cited

U.S. PATENT DOCUMENTS

| | | |
|---|---|---|
| 6,768,450 B1 | 7/2004 | Walters et al. |
| 6,799,201 B1 | 9/2004 | Lee et al. |
| 8,055,440 B2 | 11/2011 | Shintani et al. |
| 8,788,203 B2 | 7/2014 | Su et al. |
| 9,842,496 B1 | 12/2017 | Hayward |
| 2003/0194977 A1 | 10/2003 | Videtich et al. |
| 2003/0204577 A1 | 10/2003 | Videtich |
| 2003/0207682 A1 | 11/2003 | Videtich |
| 2005/0136902 A1 | 6/2005 | Mazzara, Jr. |
| 2005/0203683 A1 | 9/2005 | Olsen et al. |
| 2005/0216151 A1 | 9/2005 | Gawlik et al. |
| 2006/0003762 A1 | 1/2006 | Sumcad et al. |
| 2006/0057956 A1 | 3/2006 | Grau et al. |
| 2006/0172751 A1* | 8/2006 | Son .................. H04M 1/72412 455/502 |
| 2007/0155551 A1 | 7/2007 | Luedtke |
| 2008/0021605 A1 | 1/2008 | Huber et al. |
| 2008/0027606 A1 | 1/2008 | Helm |
| 2008/0140571 A1 | 6/2008 | Inbarajan et al. |
| 2010/0210252 A1 | 8/2010 | Choi et al. |
| 2011/0130962 A1 | 6/2011 | Lindsey |
| 2011/0215758 A1* | 9/2011 | Stahlin .................. G07C 5/008 320/109 |
| 2012/0262283 A1* | 10/2012 | Biondo .................. G07C 5/085 340/425.5 |
| 2013/0310030 A1 | 11/2013 | Ventimiglia et al. |
| 2014/0129426 A1* | 5/2014 | Lamb .................. G06Q 20/342 705/39 |
| 2014/0203077 A1 | 7/2014 | Gadh et al. |
| 2015/0127258 A1* | 5/2015 | Mont-Reynaud ............................ G01C 21/3484 701/539 |
| 2015/0371463 A1 | 12/2015 | Tamp |
| 2015/0378360 A1 | 12/2015 | Honse et al. |
| 2016/0121724 A1 | 5/2016 | Iwaya et al. |
| 2016/0147525 A1 | 5/2016 | Choi |
| 2016/0266886 A1 | 9/2016 | Sarkar et al. |
| 2017/0053459 A9* | 2/2017 | Luke .................. B60L 53/665 |
| 2017/0332274 A1 | 11/2017 | Link, II |

* cited by examiner

ON-BOARD VEHICULAR COMMUNICATION SYSTEM

CROSS-REFERENCE TO RELATED APPLICATIONS

This application is a Continuation application of U.S. patent application Ser. No. 15/684,664, entitled "ON-BOARD VEHICULAR COMMUNICATION SYSTEM," filed on Aug. 23, 2017, the contents of which is hereby incorporated in their entirety by reference.

BACKGROUND

On-board vehicular communication systems allow drivers to communicate with one or more call centers via wireless networks, such as CDMA, GSM, and LTE networks. Drivers may contact the call centers during emergencies, summon road-side assistance, ask for navigation directions, and request vehicle diagnostics. Many on-board systems provide audio interfaces to allow drivers to communicate with the call centers. Additionally, drivers may also rely on textual input/output or other methods of communication.

To better assist drivers, the on-board systems may transmit global positioning system (GPS) data to the call centers to relay the vehicles' location. The GPS data may allow the call centers to provide faster road-side assistance and navigation directions, help locate lost vehicles, and offer recommendations for attractions and amenities in the vicinity of the vehicles.

Providers of the on-board communication systems may charge drivers fees for using the systems. These fees may include one-time fees, per-use fees, and/or monthly/annual fees. The fees may cover subscriptions to the wireless network, and call centers personnel and maintenance-related charges, among other relevant expenses.

Some providers of the on-board vehicular communication systems provide software applications that allow drivers to remotely access the on-board systems via mobile devices. The drivers may install the software applications on their personal mobile devices, and rely on the application interface to provide instructions and requests to the on-board vehicular communication systems. However, sending these instructions and requests over the communication networks may become costly, and improvements may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include receiving a request for an update from a mobile device, determining whether the update is a scheduled update or an unscheduled update, in response to determining that the update is an unscheduled update: requesting a first update information from a high-speed provider, receiving the first update information from the high-speed provider, and sending the first update information to the mobile device, and in response to determining that the update is a scheduled update: requesting a second update information from the telematics system, receiving the second update information from the telematics system, and sending the second update information to the mobile device.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, ATVs, boats, personal watercraft, and aircraft. In some cases, a motor vehicle includes one or more engines.

An on-board telematics system may enable a driver to remotely obtain vehicle information and control his vehicle via a wireless network. Repeated access to the telematics systems may become costly, however, as some wireless carriers may charge the driver on a per-use or per-minute basis. When using a telematics system with access to wireless networks via multiple carriers, a driver may communicate routine information over a network by a carrier with a slower connection and time-sensitive information over another network by carrier with a faster connection.

Figure 1:
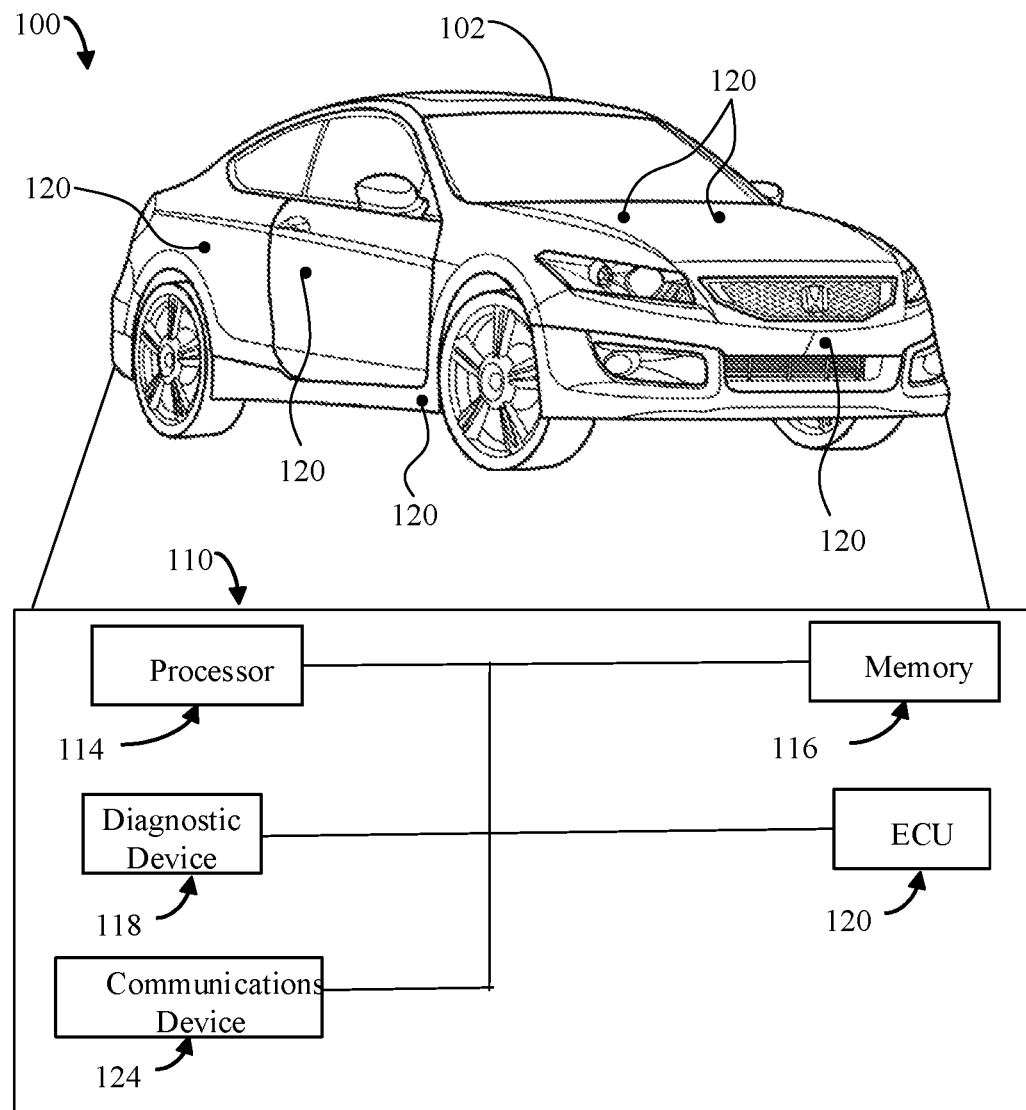
FIG. 1 illustrates a schematic view of an example operating environment of a telematics system in accordance with aspects of the present disclosure.

Turning to FIG. 1, a schematic view of an example operating environment 100 of a vehicle telematics system 110 according to an aspect of the disclosure is provided. The vehicle telematics system 110 may reside within a vehicle 102. The components of the vehicle telematics system 110, as well as the components of other systems, hardware architectures, and software architectures discussed herein, may be combined, omitted or organized into various implementations.

The vehicle 102 may generally include an electronic control unit (ECU) 122 that operably controls a plurality of vehicle systems. The vehicle systems may include, but are not limited to, the vehicle telematics system 110, among others, including vehicle HVAC systems, vehicle audio systems, vehicle video systems, vehicle infotainment systems, vehicle telephone systems, vehicle control systems, and the like.

The vehicle 102 may further include a communications device 124 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 124 of the vehicle 102 may be operably connected for internal computer communication via a bus (e.g., a CAN or a LIN protocol bus) to facilitate data input and output between the electronic control unit 122 and vehicle features and systems. In an aspect, the communications device 124 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

In some implementations, the vehicle telematics system 110 may include a diagnostic device 118 and one or more sensors 120. The diagnostic device 118 may obtain information from the sensors 120. The sensors 120 may be disposed throughout the vehicle 102, and collect information such as fuel quantity, fuel range, speedometer reading, odometer reading, door locks status, global positioning system (GPS) data, entertainment system data, tire pressure reading, battery reading, fluid level, and other information relevant to the operation of the vehicle 102.

Figure 2:
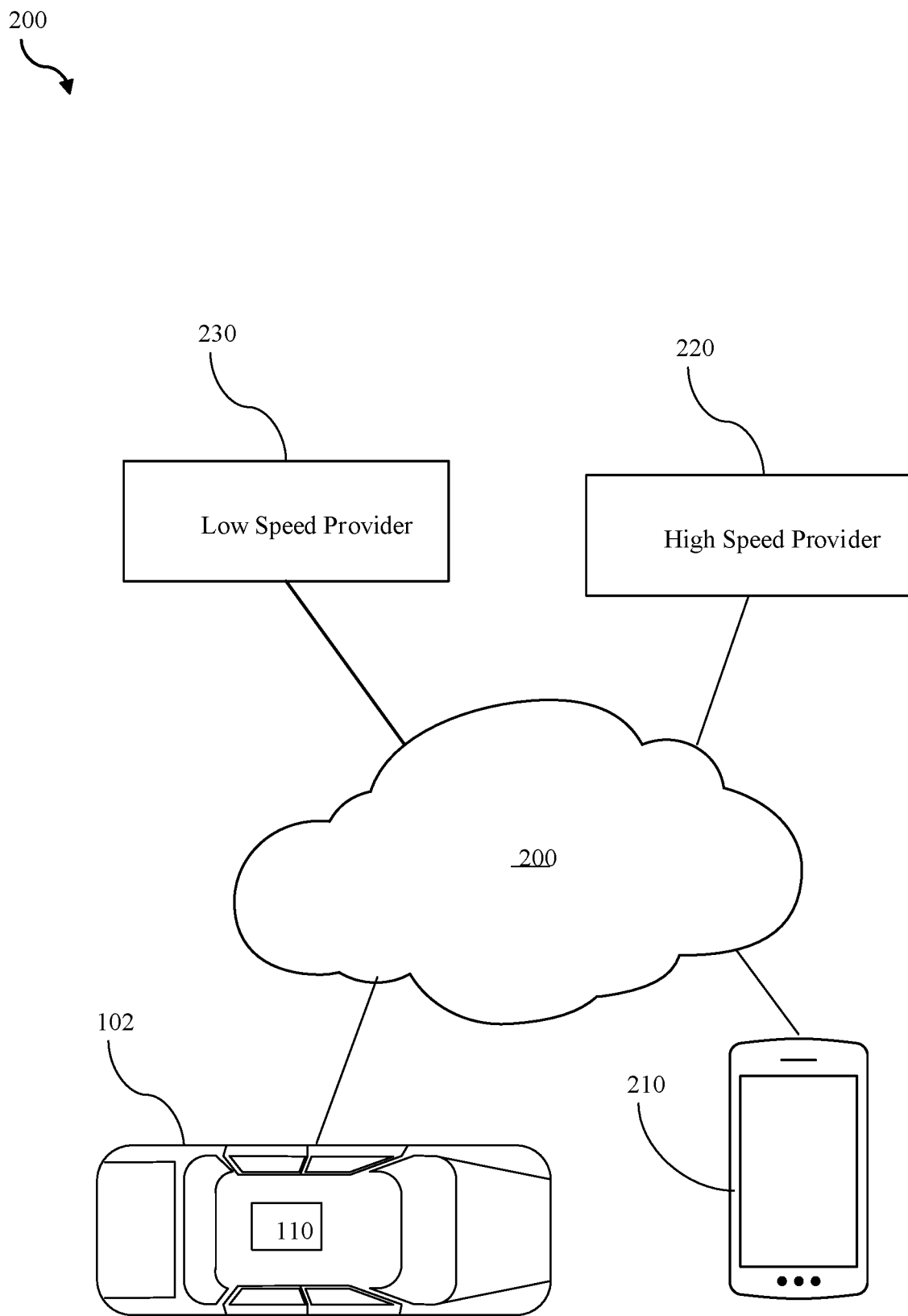
FIG. 2 illustrates an example network for managing the telematics system.

FIG. 2 illustrates an example network 200 for managing the telematics system 110. The network 200 may be a communications network that facilitates communications among multiple systems. For example, the network 200 may include the Internet or another Internet Protocol (IP) based network. The network 200 may enable the telematics system 110 to communicate with a mobile device 210, a low-speed provider 220, or a high-speed provider 230. The telematics system 110 within the vehicle 102 may communicate with the network 200 via the communications device 124. The low-speed provider and the high-speed provider 220, 230 may each include a computer system, as shown with respect to FIG. 8 described below, associated with one or more vehicle manufacturers, one or more telematics system manufacturers, dealers, streaming service providers, and/or internet service providers. In certain aspects, the high-speed provider 230 may exchange information with the telematics system 110 faster than the low-speed provider 220. In some examples, the low-speed provider 220 may belong to the one or more vehicle manufacturers. The high-speed provider 230 may belong to a third-party entity.

Figure 3:
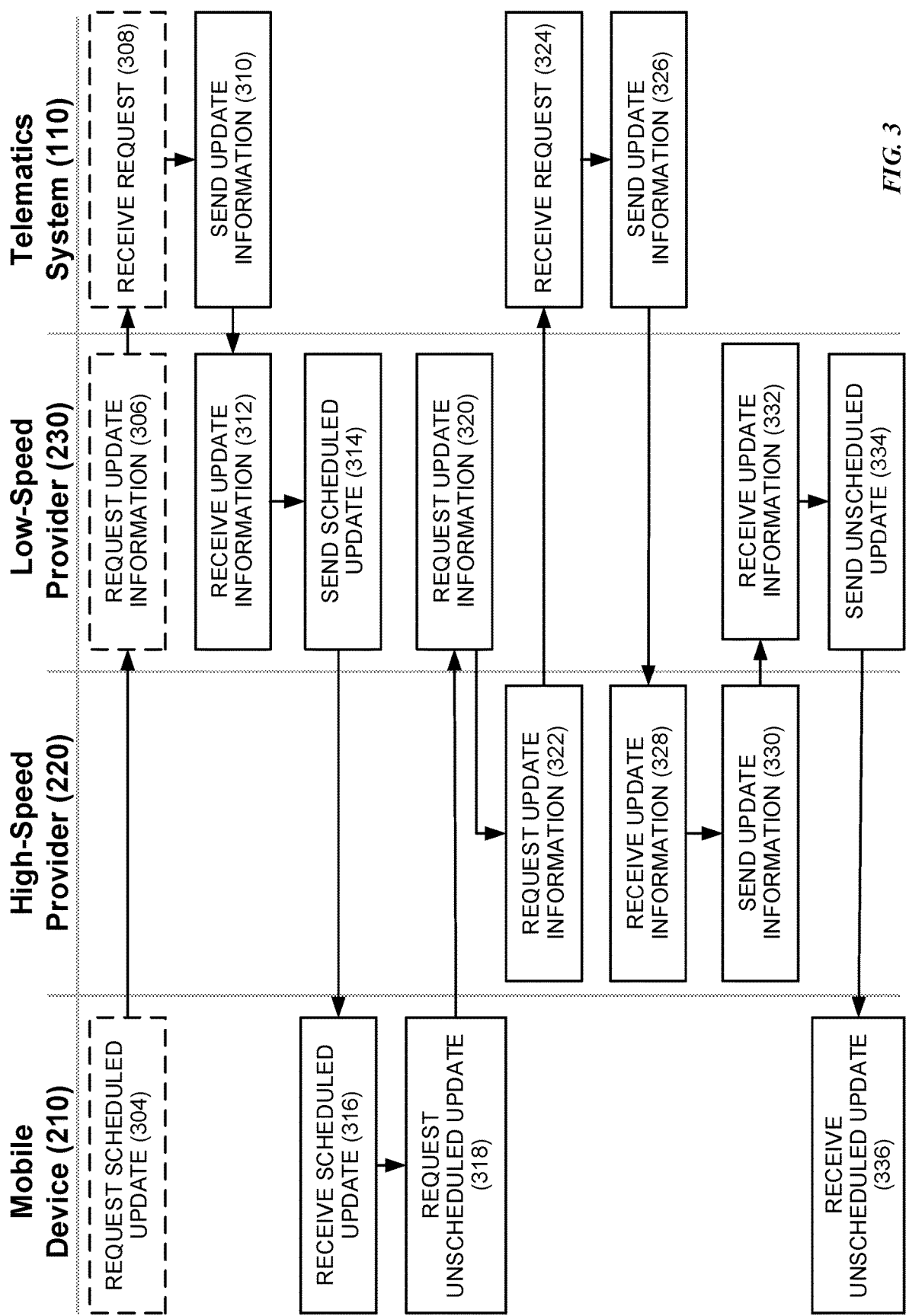
FIG. 3 illustrates an example method of obtaining update information.

Turning now to FIG. 3, in some implementations, the mobile device 210 may optionally request (304) a scheduled update from the telematics system 110. The mobile device 210 may be associated with the driver of the vehicle 102. The scheduled update may occur when the driver activates the mobile device 210 and/or loads software that connects to the telematics system 110. In certain aspects, the mobile device 210 may routinely request scheduled updates from the telematics system 110. For example, the mobile device 210 may request scheduled updates every 1, 2, 3, 5, 10, 20, 30, 50, or 60 minutes, among other intervals. The request for scheduled updates may require information such as amount of fuel, fuel range, speedometer reading, odometer reading, door locks status, global positioning system (GPS) data, entertainment system data, tire pressure reading, battery reading, and fluid levels, among other information relevant to the operation of the vehicle 102.

Next, the low-speed provider 230 may optionally request (306) update information from the telematics system 100. The request for update information may be transmitted in response to the request for the scheduled update by the mobile device 210.

In certain aspects, the telematics system 110 may optionally receive (308) the request for update information. Upon receiving (308) the request, the telematics system 110 may collect the information from the diagnostic device 118 and the sensors 120, and/or the memory 116.

Once the update information has been collected, in some aspects, the telematics system 110 may send (310) the update information to the low-speed provider 230. The update information may include some or all of the information in the request for scheduled update. In certain aspects, the telematics system 110 may send (310) additional information to the low-speed provider 230, such as information not relevant to the request for scheduled update. The telematics system 110 may determine, based on computer programs stored in the memory 116 and executed by the processor 114, that the additional information is relevant to the low-speed provider 230 and/or the driver using the mobile device (210). The computer programs may be pre-programmed by the manufacturer of the vehicle 102, or programmed by the dealer or the driver of the vehicle 102. Examples of the additional information include maintenance reminders, mechanical warnings, and service requests.

In some aspects, the telematics system 110 may send (310) update information to the low-speed provider 230 without receiving (308) a request. For example, the telematics system 110 may send (310) update information after the vehicle 102 drives for a certain distance, such as 1, 2, 5, 10, 20, or 50 miles, among other distances. Alternatively, the telematics system 110 may send (310) update information every 1, 2, 3, 5, 10, 20, 30, 50, or 60 minutes, among other intervals, during the operation of the vehicle 102. In yet another example, the telematics system 110 may send (310) update information every time an event occurs, such as vehicle start, vehicle shut-off, warning light activation, mechanical maintenance/service, airbag deployment, or other events.

In some implementations, the low-speed provider 230 receives (312) the update information from the telematics server 110.

After receiving the information, the low-speed provider 230 may send (314) the scheduled update to the mobile device 210.

Next, the mobile device 210 may receive (316) the scheduled update. The scheduled update may be stored in a log in the mobile device 210.

In some implementations, the driver may initiate an unscheduled update. For example, the driver may want to know the mileage of the vehicle 102 by accessing the odometer reading. In another example, the driver may want to know the fluid level and battery reading to determine whether the vehicle 102 requires maintenance. In yet another example, the driver may initiate an unscheduled update to obtain GPS data to locate the vehicle 102. In an aspect, the mobile device 210 may request (318) an unscheduled update from the telematics system 110.

In response to the request for the unscheduled update, in some implementations, the low-speed provider 230 may request (320) the update information from the high-speed provider 220 to fulfill the driver's request faster.

Next, the telematics system 110 may receive (324) the request for the update information, and the telematics system 110 may collect the information from the diagnostic device 118, the sensors 120, and/or the memory 116. For example, the telematics system 110 may obtain the odometer reading via the CAN. In another example, the telematics system 110 may instantiate the diagnostic device 118 to obtain fluid levels and battery reading from the sensors 120. In yet another example, the telematics system 110 may access the memory 116 to obtain the GPS data of the last known location of the vehicle 102.

After obtaining the requested update information, the telematics system 110 may send (326) the update information to the high-speed provider 220.

Next, the high-speed provider 220 may receive (328) the update information from the telematics system 110.

In the next block, the high-speed provider 220 may send (330) the update information to the low-speed provider 230 via wired or wireless networks.

The low-speed provider 230, in certain implementations, may receive (332) the update information from the high-speed provider 220.

Upon receiving the update information, in some aspects, the low-speed provider 230 may send (334) the unscheduled update to the mobile device 210 based on the update information.

In an aspect, the mobile device 210 of the driver may receive (336) the unscheduled update from the low-speed provider 230. The scheduled update may be stored in a log in the mobile device 210.

Figure 4:
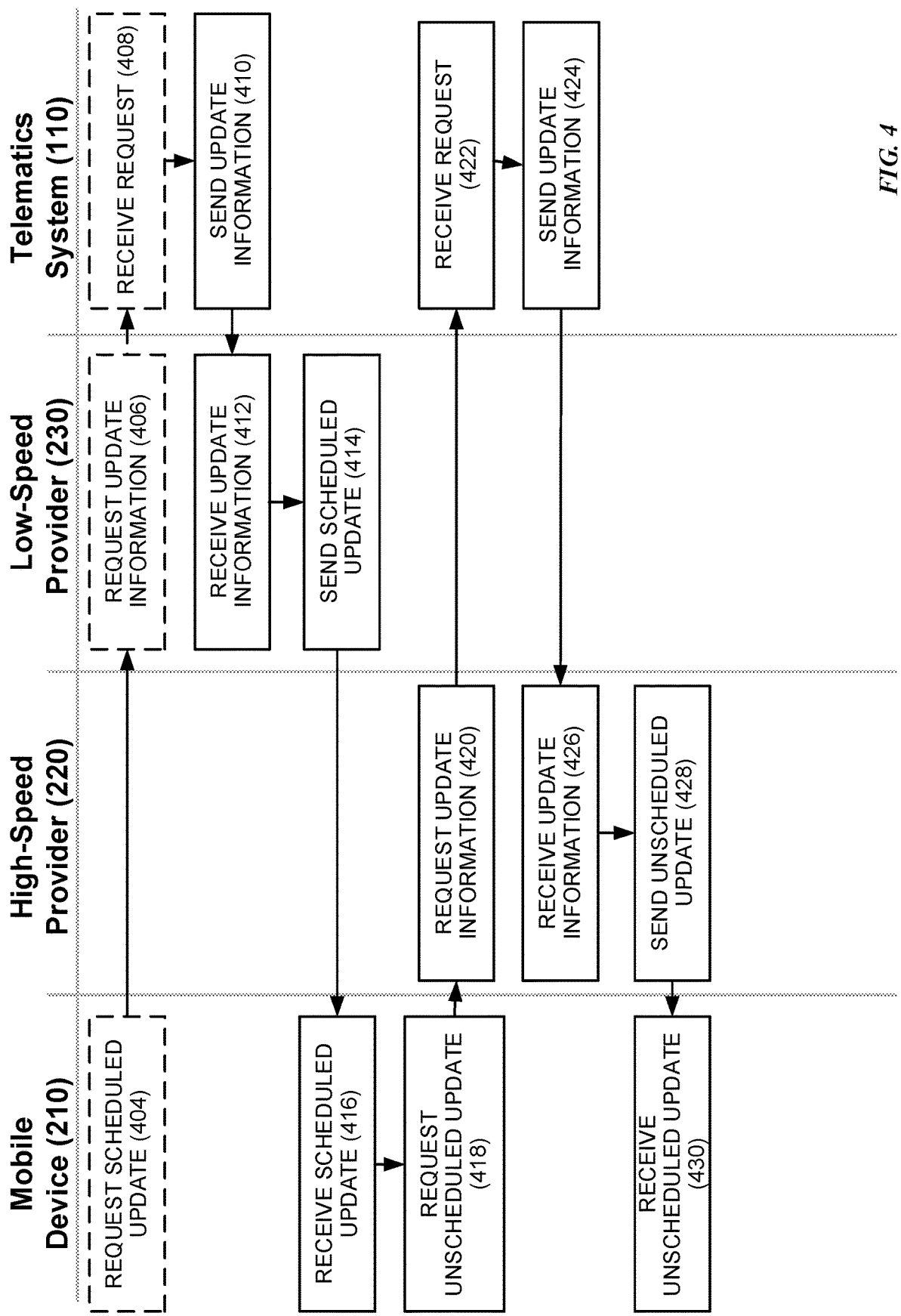
FIG. 4 illustrates another example method of obtaining update information.

Turning now to FIG. 4, in some implementations, the mobile device 210 may optionally request (404) a scheduled update from the telematics system 110.

The low-speed provider 230 may optionally request (406) update information from the telematics system 100. The request for update information may be transmitted in response to the request for the scheduled update by the mobile device 210.

In certain aspects, the telematics system 110 may optionally receive (408) the request for update information. Upon receiving (408) the request, the telematics system 110 may collect the information from the diagnostic device 118, the sensors 120, and/or the memory 116.

Once the update information has been collected, in some aspects, the telematics system 110 sends (410) the update information to the low-speed provider 230. The update information may include some or all of the information in the request for scheduled update.

In some aspects, the telematics system 110 may send (410) update information to the low-speed provider 230 without receiving (408) a request. For example, the telematics system 110 may routinely send (410) update information to the low-speed provider 230 as described above.

In some implementations, the low-speed provider 230 receives (412) the update information from the telematics server 110.

After receiving the information, the low-speed provider 230 may send (414) the scheduled update to the mobile device 210.

Next, the mobile device 210 may receive (416) the scheduled update. The scheduled update may be stored in a log in the mobile device 210.

In some implementations, the driver may initiate an unscheduled update. In an aspect, the mobile device 210 may request (418) an unscheduled update from the telematics system 110 via the high-speed provider 220.

In response to the request for an unscheduled update, in some implementations, the high-speed provider 220 may request (420) the update information.

Next, the telematics system 110 may receive (422) the request for the update information and the telematics system 110 may collect the information from the diagnostic device 118 and the sensors 120, and/or the memory 116.

After obtaining the requested update information, the telematics system 110 may send (424) the update information to the high-speed provider 220.

Next, the high-speed provider 220 may receive (426) the update information from the telematics system 110.

In some aspects, the high-speed provider 220 may send (428) the unscheduled update to the mobile device 210 based on the update information.

The mobile device 210 of the driver may receive (430) the unscheduled update from the low-speed provider 230.

Figure 5:
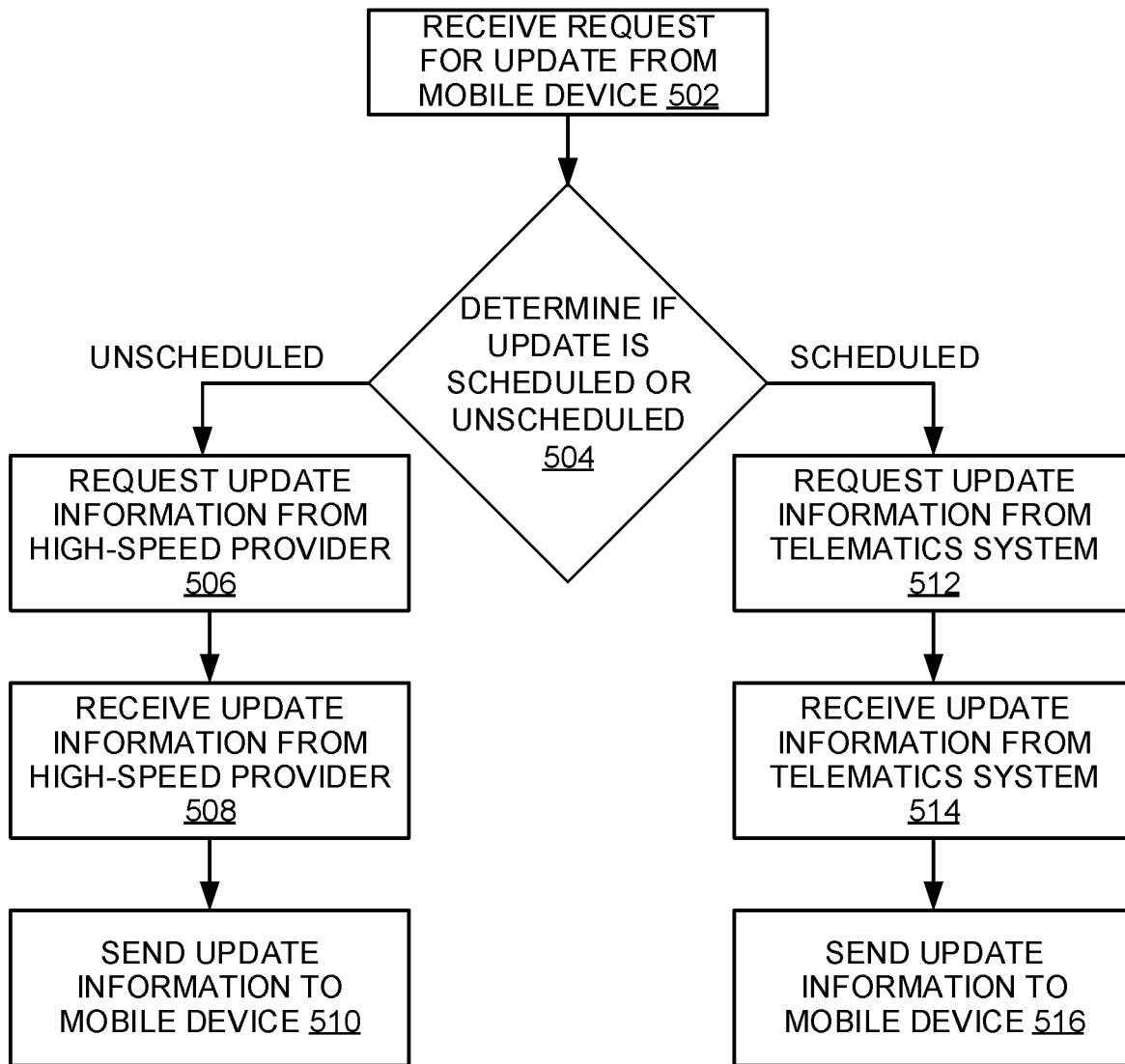
FIG. 5 illustrates yet another example method of obtaining update information.

Turning now to FIG. 5, in some aspects, the low-speed provider 230 may receive (502) a request for update from the mobile device 210. The request for update may be for a scheduled update and/or an unscheduled update.

The low-speed provider 230 determines (504) if the request for update is for a scheduled or unscheduled update. The scheduled update may include periodic updates, routine updates, and/or event-triggered updates as described above. The unscheduled update may be initiated by the driver of the vehicle 102. The low-speed provider 230 may determine based on algorithms stored in the memory 116 and executed by the processor 114.

In some implementations, for the unscheduled update, the low-speed provider 230 may request (506) update information from the high-speed provider 220.

Next, the low-speed provider 230 may receive (508) the update information from the high-speed provider 220.

Upon receiving the update information, in some aspects, the low-speed provider 230 may send (510) the unscheduled update to the mobile device 210 based on the update information.

Alternatively, the if low-speed provider 230 determines (504) that the request for update is for a scheduled update, the low-speed provider 230 may bypass the high-speed provider 220 and communicate with the telematics system 110 directly.

In some implementations, for the unscheduled update, the low-speed provider 230 may request (512) update information from the telematics system 110.

Next, the low-speed provider 230 may receive (514) the update information from the high-speed provider 220.

Upon receiving the update information, in some aspects, the low-speed provider 230 may send (516) the scheduled update to the mobile device 210 based on the update information.

Figure 6:
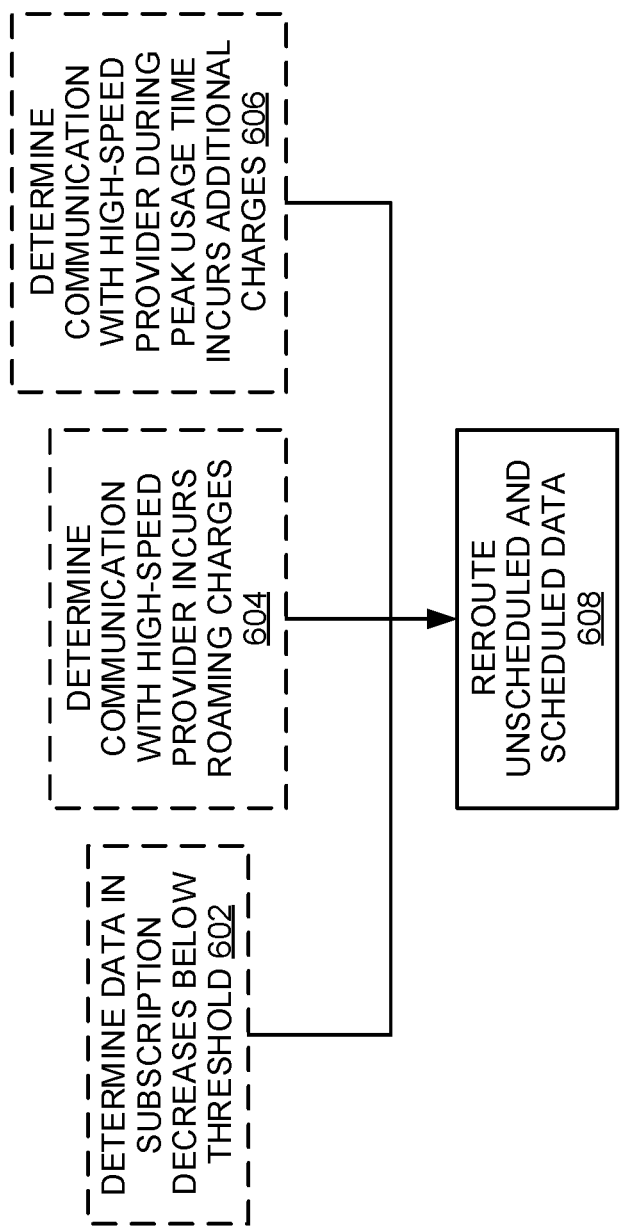
FIG. 6 illustrates an example method of determining when to reroute data.

In other aspects, as shown in FIG. 6, the low-speed provider 230 may utilize the high-speed provider 220 for unscheduled and scheduled updates, and selectively utilize the bypass methods shown in FIGS. 3-5. The low-speed provider 230 may determine if the driver's subscription plan meets or fails to meet certain criteria before performing the methods shown in FIGS. 3-5. For example, if low-speed provider 230 determines (602) that the amount of data in the driver's subscription plan with the high-speed provider 220 decreases below a predetermined threshold, the low-speed provider 230 may reroute (608) the unscheduled updates through the high-speed provider 220 and the scheduled updates through the low-speed provider 230 to conserve data. In other aspects, if low-speed provider 230 determines (604) that any communication with the high-speed provider 220 may incur roaming charges, the low-speed provider 230 may reroute (608) the unscheduled updates through the high-speed provider 220 and the scheduled updates through the low-speed provider 230 to reduce roaming charges associated with the high-speed provider 220. In yet another example, if the low-speed provider 230 determines (606) that any communication with the high-speed provider 220 during a peak usage time may incur additional charges, the low-speed provider 230 may reroute (608) the unscheduled updates through the high-speed provider 220 and the scheduled updates through the low-speed provider 230 to reduce the additional charges associated with the peak usage time.

Figure 7:
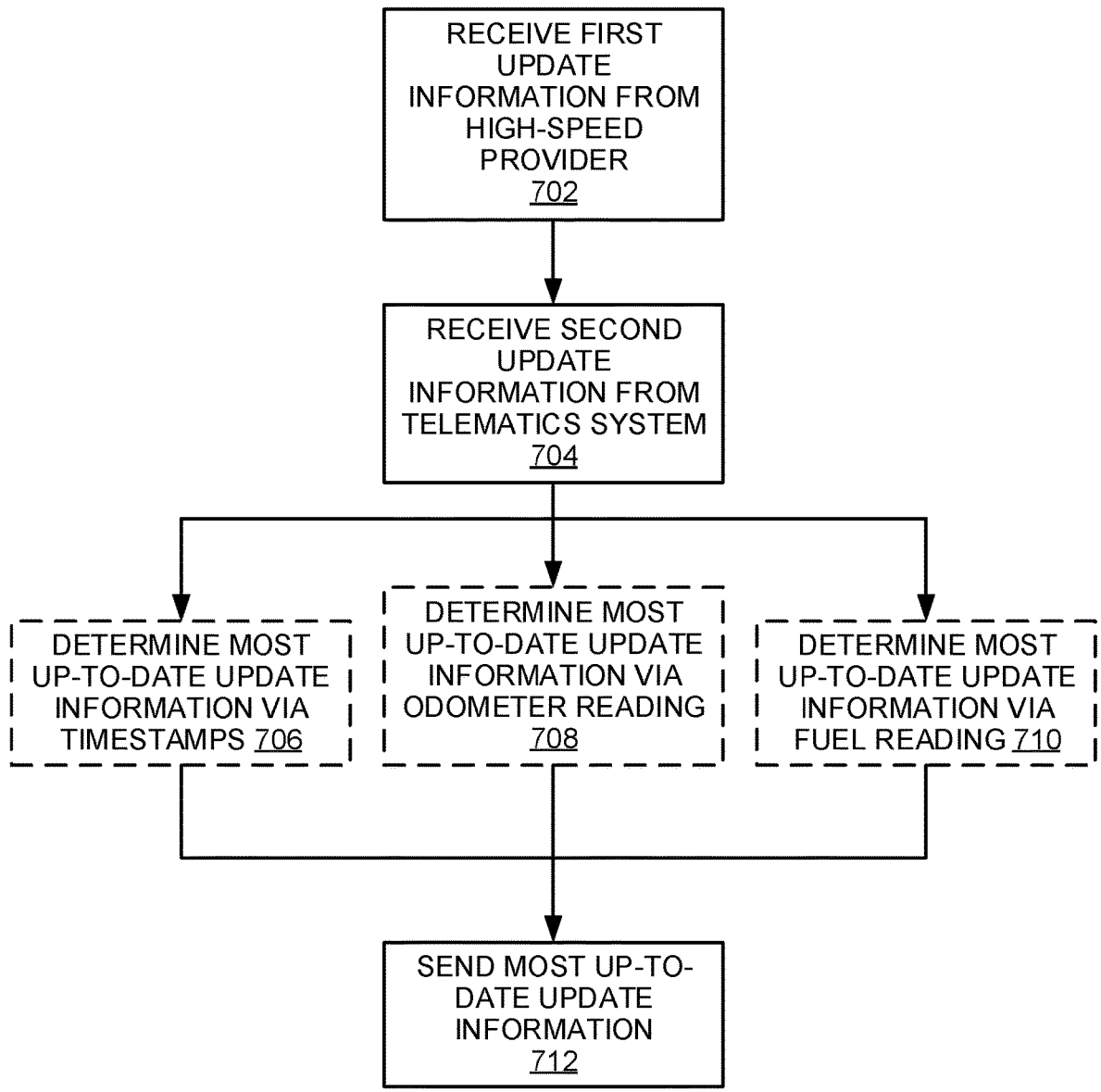
FIG. 7 illustrates an example method of sending up-to-date update information.

Referring now to FIG. 7, the low-speed provider 230 may receive (702) a first update information from the high-speed provider 220, and receive (704) a second update information from the telematics system 110. The first update information and the second update information may optionally include one or more of the following: a timestamp, an odometer reading, and a fuel reading. Next, the low-speed provider 230 may optionally determine (706) up-to-date update information between the first update information and the second update information using the timestamps. For example, up-to-date update information may include a more recent timestamp. Alternatively, or additionally, the low-speed provider 230 may optionally determine (708) up-to-date update information between the first update information and the second update information using the odometer readings. For example, up-to-date update information may include a higher odometer reading. Alternatively, or additionally, the low-speed provider 230 may optionally determine (710) the up-to-date update information between the first update information and the second update information using the fuel readings. For example, the up-to-date update information may include a lower fuel reading. After determining the up-to-date update information, between the first and the second update information, the low-speed provider 230 may send (712) the up-to-date update information to the mobile device 210.

Figure 8:
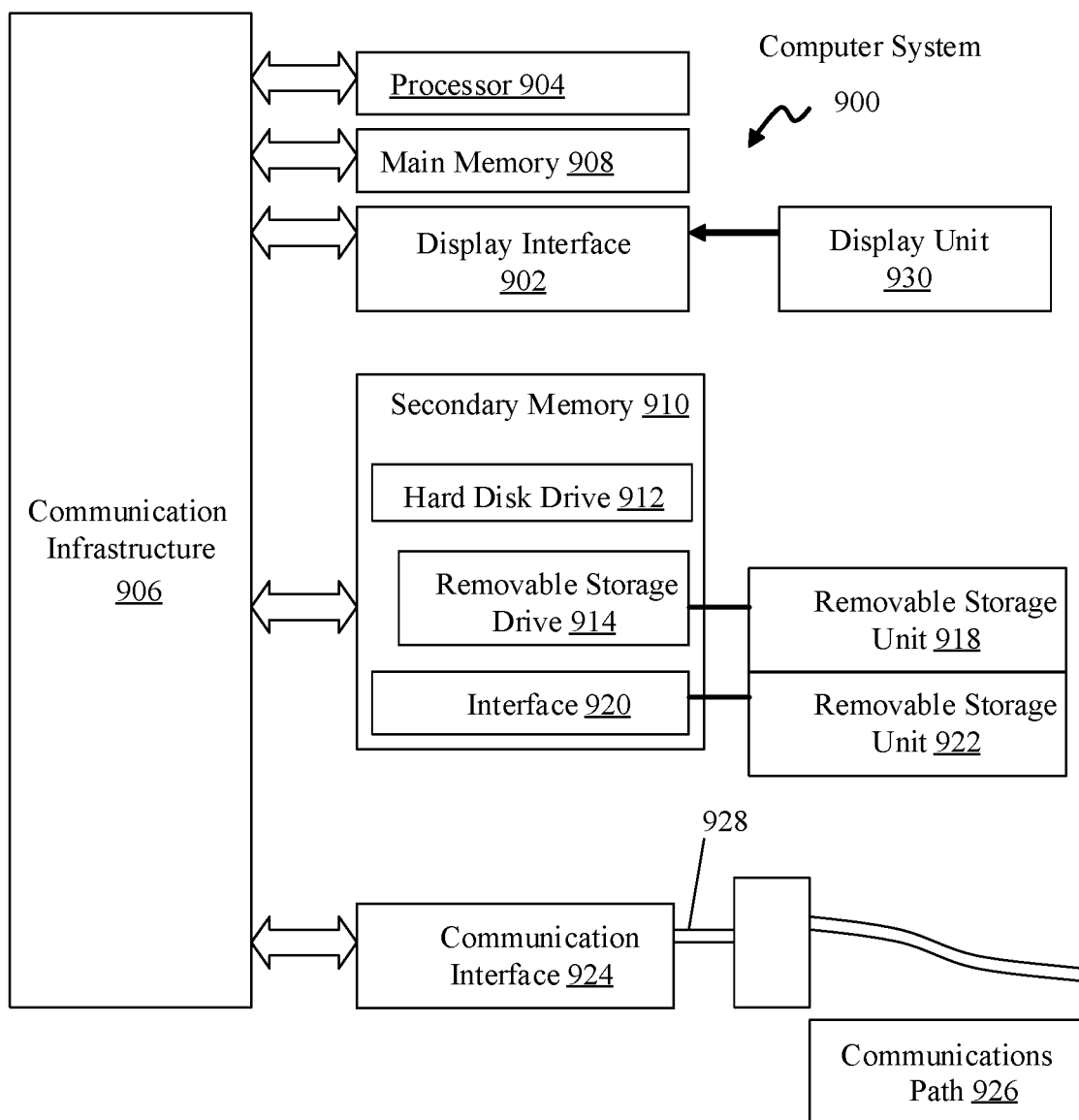
FIG. 8 illustrates an example computer system in accordance with an aspect of the invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 900 is shown in FIG. 8.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912, and/or a removable storage drive 914, representing a floppy disk drive, a magnetic tape drive, an optical disk drive, a universal serial bus (USB) flash drive, etc. The removable storage drive 914 reads from and/or writes to a removable storage unit 918 in a well-known manner. Removable storage unit 918 represents a floppy disk, magnetic tape, optical disk, USB flash drive etc., which is read by and written to removable storage drive 914. As will be appreciated, the removable storage unit 918 includes a computer usable storage medium having stored therein computer software and/or data.

Alternative aspects of the present invention may include secondary memory 910 and may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 918, a hard disk installed in hard disk drive 912, and signals 928. These computer program products provide software to the computer system 900. Aspects of the present invention are directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features in accordance with aspects of the present invention, as discussed herein. In particular, the computer programs, when executed, enable the processor 904 to perform the features in accordance with aspects of the present invention. Accordingly, such computer programs represent controllers of the computer system 900.

In an aspect of the present invention where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of sending up-to-date update information to a mobile device, comprising:
   receiving a first update information from a high-speed provider;
   receiving a second update information from a telematics system;
   determining a more recent one of the first update information and the second update information; and
   providing the more recent one of the first update information and the second update information as the up-to-date update information to the mobile device.

2. The method of claim 1, wherein:
   the first update information includes a first odometer reading;
   the second update information includes a second odometer reading; and
   determining the up-to-date update information includes determining an update information with a higher odometer reading based on the first odometer reading and the second odometer reading.

3. The method of claim 1, wherein:
   the first update information includes a first timestamp;
   the second update information includes a second timestamp; and
   determining the up-to-date update information includes determining an update information with a more recent timestamp based on the first timestamp and the second timestamp.

4. The method of claim 1, wherein:
   the first update information includes a first fuel reading;
   the second update information includes a second fuel reading; and
   determining the up-to-date update information includes determining an update information with a lower fuel reading based on the first fuel reading and the second fuel reading.

5. The method of claim 1, wherein the high-speed provider is associated with a streaming company.

6. The method of claim 1, further comprising receiving a plurality of scheduled updates during an operation of the vehicle.

7. The method of claim 6, wherein the plurality of scheduled updates occurs during a vehicle start, a vehicle shut-off, a warning light activation, a mechanical service, or an airbag deployment.

8. A computer system for obtaining up-to-date update information from a telematics system in a vehicle, comprising:
   a memory comprising instructions; and
   one or more processors configured to execute the instructions to perform the functions of:
   receiving a first update information from a high-speed provider;
   receiving a second update information from a telematics system;
   determining a more recent one of the first update information and the second update information; and
   providing the more recent one of the first update information and the second update information as the up-to-date update information to the mobile device.

9. The computer system of claim 8, wherein:
   the first update information includes a first odometer reading;
   the second update information includes a second odometer reading; and
   determining the up-to-date update information includes determining an update information with a higher odometer reading based on the first odometer reading and the second odometer reading.

10. The computer system of claim 8, wherein:
    the first update information includes a first timestamp;
    the second update information includes a second timestamp; and
    determining the up-to-date update information includes determining an update information with a more recent timestamp based on the first timestamp and the second timestamp.

11. The computer system of claim 8, wherein:
    the first update information includes a first fuel reading;
    the second update information includes a second fuel reading; and
    determining the up-to-date update information includes determining an update information with a lower fuel reading based on the first fuel reading and the second fuel reading.

12. The computer system of claim 8, wherein the high-speed provider is associated with a streaming company.

13. The computer system of claim 8, wherein the one or more processors are further configured to execute the instructions to perform the function of receiving a plurality of scheduled updates during an operation of the vehicle.

14. The computer system of claim 13, wherein the plurality of scheduled updates occurs during a vehicle start, a vehicle shut-off, a warning light activation, a mechanical service, or an airbag deployment.

15. A non-transitory computer readable medium storing computer-executable instructions that, when executed by one or more processors of a computer, cause the one or more processors to perform the method comprising:

receiving a first update information from a high-speed provider;

receiving a second update information from a telematics system;

determining a more recent one of the first update information and the second update information; and providing the more recent of the first update information and the second update information as up-to-date update information to the mobile device.

16. The computer readable medium of claim 15, wherein:

the first update information includes a first odometer reading;

the second update information includes a second odometer reading; and determining the up-to-date update information includes determining an update information with a higher odometer reading based on the first odometer reading and the second odometer reading.

17. The computer readable medium of claim 15, wherein:

the first update information includes a first timestamp;

the second update information includes a second timestamp; and determining the up-to-date update information includes determining an update information with a more recent timestamp based on the first timestamp and the second timestamp.

18. The computer readable medium of claim 15, wherein:

the first update information includes a first fuel reading;

the second update information includes a second fuel reading; and determining the up-to-date update information includes determining an update information with a lower fuel reading based on the first fuel reading and the second fuel reading.

19. The computer readable medium of claim 15, wherein the high-speed provider is associated with a streaming company.

20. The computer readable medium of claim 15, further comprising instructions that, when executed by the one or more processors of the computer, cause the one or more processors to perform the method of receiving a plurality of scheduled updates during an operation of the vehicle.

* * * * *